(12) United States Patent
Da Rosa Holtremann

(10) Patent No.: US 9,278,639 B2
(45) Date of Patent: Mar. 8, 2016

(54) MOBILE SCUBA DIVING CENTRE

(76) Inventor: João Ricardo Da Rosa Holtremann, Lisbon (PT)

( * ) Notice: Subject to any disclaimer, the term of this patent is extended or adjusted under 35 U.S.C. 154(b) by 21 days.

(21) Appl. No.: 14/239,097

(22) PCT Filed: Aug. 16, 2012

(86) PCT No.: PCT/IB2012/054178
§ 371 (c)(1),
(2), (4) Date: Apr. 10, 2014

(87) PCT Pub. No.: WO2013/024455
PCT Pub. Date: Feb. 21, 2013

(65) Prior Publication Data
US 2014/0346800 A1   Nov. 27, 2014

(30) Foreign Application Priority Data

Aug. 16, 2011   (PT) .......................................... 105856

(51) Int. Cl.
*B60P 3/14* (2006.01)
*B63C 11/02* (2006.01)

(52) U.S. Cl.
CPC ............. *B60P 3/14* (2013.01); *B63C 2011/023* (2013.01); *B63C 2011/025* (2013.01)

(58) Field of Classification Search
CPC ............. B60R 9/08; B60R 2011/0003; B60R 2011/0036; B60R 5/003; B60R 5/041; B60P 3/14; B63C 11/02; B63C 2011/023; B63C 2011/025
USPC ...................... 296/24.31–24.39; 224/401, 406
See application file for complete search history.

(56) References Cited

U.S. PATENT DOCUMENTS 3,275,161 A * 9/1966 Robertson ...................... 224/401
4,168,007 A * 9/1979 Rohatensky ............... 211/85.18
(Continued)

FOREIGN PATENT DOCUMENTS

GB   2 451 126 A   1/2009

OTHER PUBLICATIONS

International Search Report, mailed Dec. 4, 2012 in connection with PCT International Application No. PCT/IB2012/054178, filed Aug. 16, 2012.
(Continued)

*Primary Examiner* — Gregory Blankenship
(74) *Attorney, Agent, or Firm* — John P. White; Cooper & Dunham LLP

(57) ABSTRACT

The mobile scuba diving center is an equipment designed to streamline the logistics associated to various ways of the scuba diving operation, by enhancing both safety and comfort, and preventing damages to the scuba equipment, while enabling to easily make available complete support bases for diving in remote locations, as well as eliminating or considerably reducing all manual assignments that are typically connected with the activity hereof. The mobile scuba diving center includes a base structure that comprises such diverse elements like a shell (1), stowage drawers (3), clipping devices (4) or support boxes for the scuba tanks (15), the compressor hose lines to fill the scuba tanks, a rotary hanging rod to hang wetsuits and dry-suits and also an assembly line of hoses and sprays to wash the scuba gear inside the drawers (9) and another assembly line of hoses and sprays to wash wetsuits, scuba tanks and BCs (10). The dive center can further include a ramp or access steps (13) and a protection awning (14).

18 Claims, 11 Drawing Sheets

(56) References Cited

U.S. PATENT DOCUMENTS

| | | | | |
|---|---|---|---|---|
| 4,729,394 | A * | 3/1988 | Timmes et al. | 134/199 |
| 5,685,440 | A * | 11/1997 | Mason | 211/189 |
| 5,901,890 | A * | 5/1999 | Stokes | 224/406 |
| 6,345,853 | B1 * | 2/2002 | Price et al. | 296/1.01 |
| 6,565,103 | B2 * | 5/2003 | Wilson | 280/47.24 |
| 6,571,811 | B2 * | 6/2003 | Kabboush | 134/170 |
| 8,523,256 | B2 * | 9/2013 | McCoubrey | 296/24.32 |
| 8,637,842 | B2 * | 1/2014 | Case et al. | 250/517.1 |
| 8,733,813 | B2 * | 5/2014 | Blackwell et al. | 296/24.38 |
| 2004/0201239 | A1 * | 10/2004 | Pellegrin, Jr. | 296/24.38 |
| 2009/0121509 | A1 * | 5/2009 | Coy et al. | 296/24.32 |
| 2009/0159108 | A1 | 6/2009 | Dannewitz | |
| 2010/0052351 | A1 * | 3/2010 | Sartin et al. | 296/20 |
| 2010/0301624 | A1 * | 12/2010 | Boos et al. | 296/24.32 |
| 2011/0316299 | A1 * | 12/2011 | Mccoubrey | 296/24.32 |
| 2013/0140841 | A1 * | 6/2013 | Sartin et al. | 296/24.38 |

OTHER PUBLICATIONS

Written Opinion of the International Searching Authority, mailed Dec. 4, 2012 in connection with PCT International Application No. PCT/IB2012/054178, filed Aug. 16, 2012.

* cited by examiner

MOBILE SCUBA DIVING CENTRE

CROSS-REFERENCE TO RELATED APPLICATIONS

This application is a §371 national stage of PCT International Application No. PCT/IB2012/054178, filed Aug. 16, 2012, claiming priority of Portuguese Patent Application No. 105856, filed Aug. 16, 2011, the contents of each of which are hereby incorporated by reference in their entirety.

FIELD OF THE INVENTION

The invention disclosed herein relates to a complete scuba diving centre, either mobile or fixed, that is designed aiming to remove or to considerably smooth the manual logistic assignments that comprise most part of the job related to a scuba diving operation for recreational, commercial, scientific or rescue/security purposes, as follows: The stowing for transportation, scuba gear distribution/arrangement, scuba gear dressing and adjustment onto scuba divers, tank arrangement for filling, tank filling station, scuba gear washing, scuba gear drying-out arrangement and the scuba gear storage.

The mobile scuba diving centre entails in itself all required components for the logistics associated to scuba diving, comprising all areas and operational storage devices for the scuba diving equipment and ancillaries, as well as the scuba divers preparation area. It further comprises compressor lines for scuba tanks filling and a spray-based automatic washing system for the entire equipment. The mobile scuba diving centre disclosed herein stands for a complete, movable scuba diving operation spot that can be adapted to various portable, fixed scuba bases, as follows: motor vehicles, trailers, containers, boats and airplanes.

SUMMARY OF THE INVENTION

This invention aims to describe a mobile scuba diving centre that presents a base structure comprising the following elements, as follows:
Shell (1);
Stowage drawers (3);
Tank clipping devices (4) or support boxes (5) for the scuba tanks (15);
Compressor hose lines for scuba tank filling (6);
Circuit adapters for the scuba tank filling station (7);
Hanging rods for wetsuits and dry-suits (8);
Hose and spray lines to wash the scuba gear inside the drawers (9);
Hose and spray lines to wash wetsuits, BCs and tanks (10).
In a preferred embodiment, the mobile scuba diving centre includes ramps/access steps (13).
In another preferred embodiment, the mobile scuba diving centre includes retractable ramps/access steps (13).
In a further preferred embodiment, the mobile scuba diving centre includes hanging rods to hang wetsuits and dry-suits (8) with a rotary basis.
In another preferred embodiment, the mobile scuba diving centre includes a sealed coverage.
In a further preferred embodiment, the mobile scuba diving centre includes a base structure provided with lighting means.
In another preferred embodiment, the mobile scuba diving centre includes adapters to connect the compressor hoses to the scuba tanks that are arranged within embedded compartments inside the base structure.

In another yet preferred embodiment, the mobile scuba diving centre includes hose and spray lines to wash BC jackets, scuba tanks, wetsuits and dry-suits (10) fixed onto the interior ceiling of the bodywork structure.

In another preferred embodiment, the mobile scuba diving centre includes an area for the assembly of a water tank (17).

In another further preferred embodiment, the mobile scuba diving centre includes an area for the assembly of a compressor station (18).

In another preferred embodiment, the mobile scuba diving centre includes a connection to air, water external supply networks (16).

The purpose of the invention hereof is to describe the use of the aforementioned mobile scuba diving centre for all diving operations, either for recreation, commercial, scientific and/or rescue/security purposes.

BACKGROUND OF THE INVENTION

Diving with Self-Contained Underwater Breathing Apparatus (SCUBA) is an activity that currently encompasses such areas like recreation/tourism, industrial/commercial, security/rescue and scientific research. It stands for an activity that features a significant number of equipment which, due to its nature (weight, size, and fragility) entails an outstanding logistic operation. As for recreational dives, dive centres represent a chief support for scuba diving, by providing the facilities whereupon diver may find availability of rental equipment, as well as a place to store, to remove and to wash his/her own scuba gear, charging one's scuba tanks, while getting transportation to the dive spot, dive training centre, among other services.

The equipment transportation, distribution and control, as well as washing, drying-out and storage of scuba gear stand for a major time and labour employed in the activity of a recreational dive centre, particularly if its location is away from dive spots or the mooring point. Scuba gear comprises both heavy equipment and fragile items, and its poor storage and transportation, even if along small distances, can frequently lead to serious damages to the equipment.

Whenever so possible, recreational divers are always searching for new dive spots. However, many areas provide optimum conditions for diving during only part of the year, which in turn will restrict the launch of new dive centres in those areas that fail to be properly explored by diving tourism industry due to its lack of available logistic support.

As far as scientific diving, commercial/industrial diving or diving carried out by security and rescue forces, the mobile scuba diving centre can further meet, also due to its specific layout, to straightforward requirements of easier displacement means, improved safety in transportation, enhanced facility, comfort and swiftness to dress/undress diver's own scuba gear and the proper storage, maintenance and preservation of all scuba gears.

GENERAL DESCRIPTION OF THE INVENTION

The mobile scuba diving centre is a complete mobile, fixed dive centre with air lines for filling scuba tanks and water lines to wash the integrated equipment, hereby described as non-limiting as a module applied over a motor vehicle-based trailer.

The mobile scuba diving centre comprises a main bench wherein scuba tanks are fitted into, secured with clamps to the bench backside or inside boxes that are embedded into the structure. Buoyancy Compensator Jackets [BCs] may be placed onto the scuba tanks and, therefore, can be safely carried. Under scuba tanks, individual drawers can carry various items of the remaining scuba diver's gear, placed directly underneath the scuba tank that he/she will use.

Both drawers and the bench are faced outwardly, so to make more efficient the space use and so to ensure that more than a scuba diver may easily gear up at the same time. The bench overall size and the ways of securing scuba tanks are designed in order to lessen the effort placed upon the inspection, adjustment and dressing tasks of the entire scuba gear. On the side of this main structure, the invention discloses two steps or retractable ramps that, as they are open, will make the access to the bench and drawers easier, further enabling a dressing base whereupon scuba divers may dress or undress one's scuba gear without dirtying it or damaging it.

Above this base structure, a sealed coverage is applied to, which can be equipped with lighting means. The coverage side doors open outwardly, thus comprising an awning providing protection against rain/sun light in the scuba divers dressing area.

A rotary hanging rod fixed onto the base provides the proper support for wetsuits and dry-suits hung onto hangers. When it is unfolded, it makes the wetsuits and dry-suits available on the coverage outside, and it can be folded to close the coverage for transportation purposes. The compressor lines for scuba tanks filling runs underneath the bench, in the rear of scuba tanks. Adapters to interconnect the compressor hoses to scuba tanks are arranged into compartments that are embedded onto the structure, so to become readily available upon the scuba tanks charging, yet protected and out of the way through the remaining operations. Above the drawers inside the bench structure and running along the coverage structure ceiling, water and spray line assemblies run and, as the coverage is closed, it enables the automatic rinsing of the entire equipment, including concurrently with the scuba tanking filling process. All drawers can be removed from the structure, thus allowing access to its inside for washing and maintenance purposes.

The invention further comprises a dry area to store a portable scuba dive compressor along with a water tank for washing, plus additional equipment, a storeroom and further items. The same arrangement and structure can be otherwise applied to a fixed container, a motor vehicle or alike, whereby the entire arrangement and storage of the equipment has been designed aiming its safe transportation immediately after it has been used.

DESCRIPTION OF FIGURES

For a better understanding of the present invention, the enclosed figures describe preferred embodiments of the invention without, nonetheless, limiting the purpose of the invention hereof.

DETAILED DESCRIPTION OF THE INVENTION

Figure 1A:
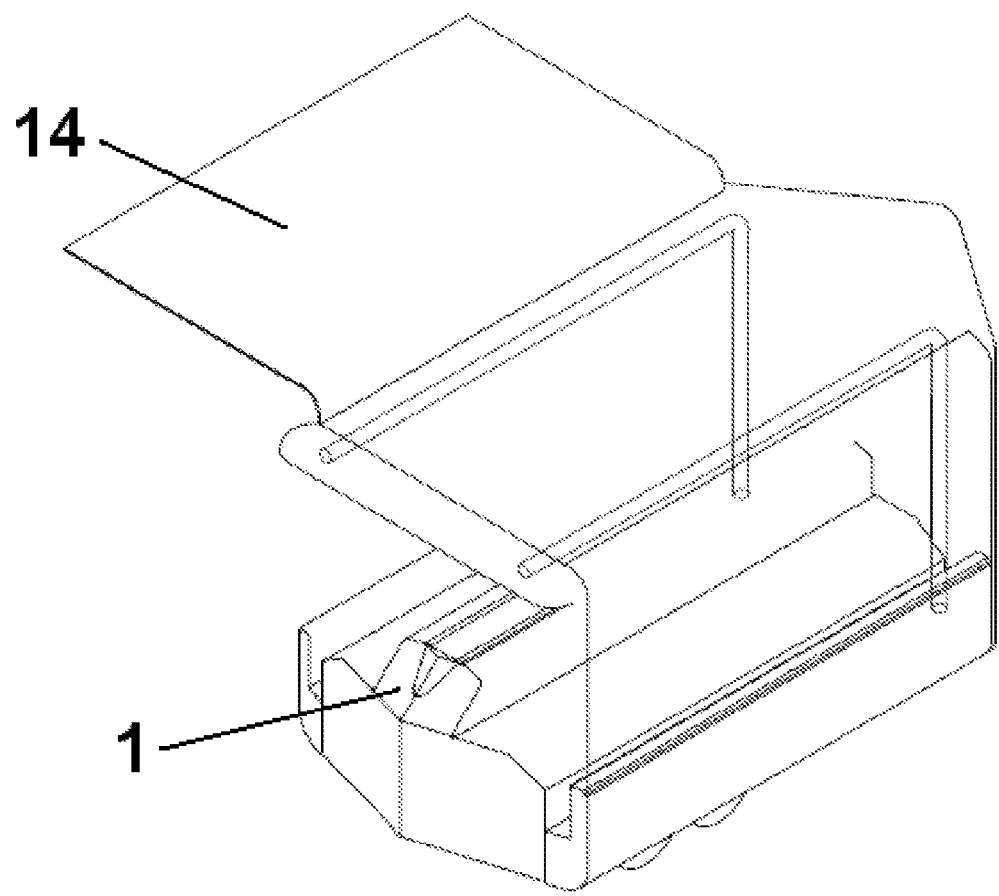
FIGS. 1a, 1b, 1c, 1d and 1e illustrate the operation of the coverage structure. In all Figures, the following elements are depicted, as follows:
1—Shell;
3—Drawers;
8—Hanging rods for wetsuits and dry-suits;
13—Ramp/Access steps;
14—Protection awnings.
Figure 1B:
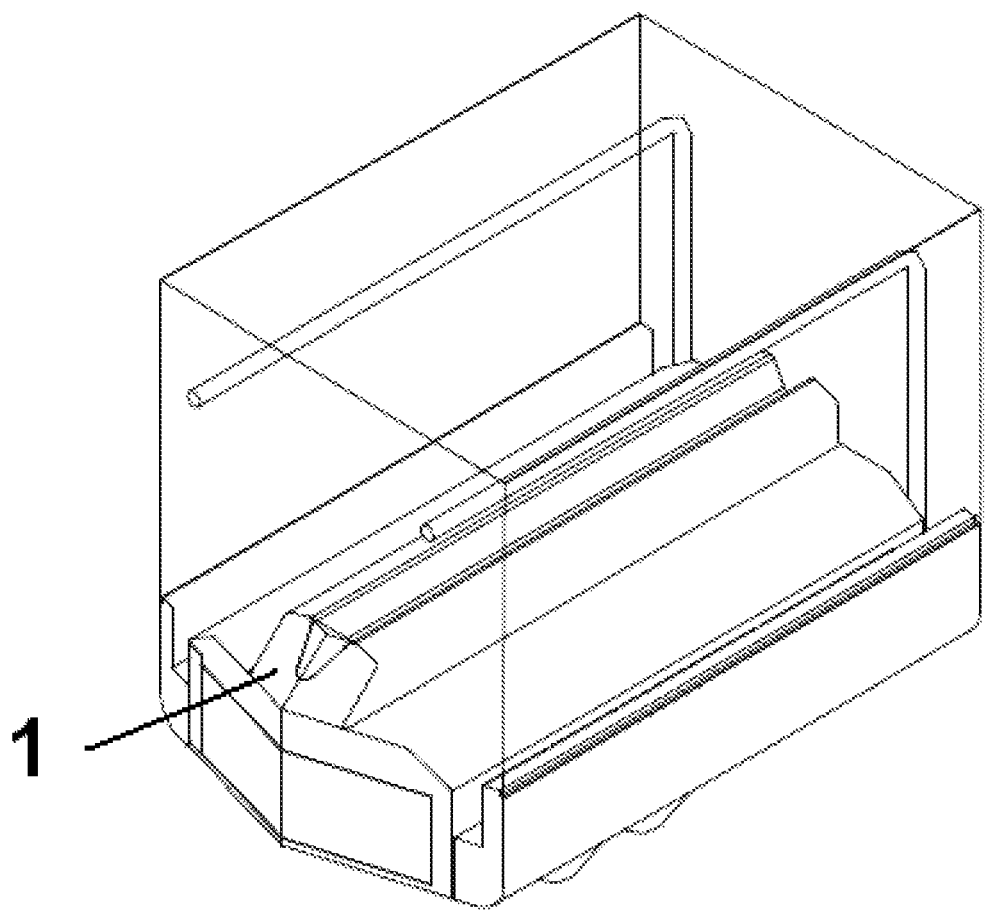
Figure 1C:
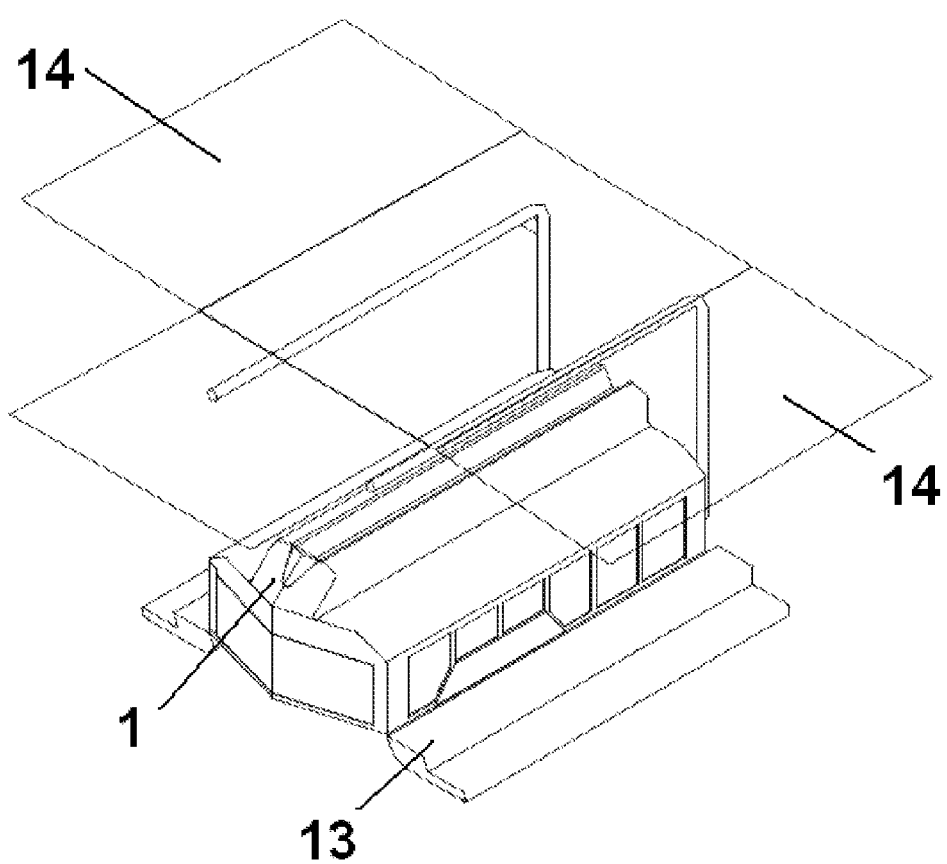
Figure 1D:
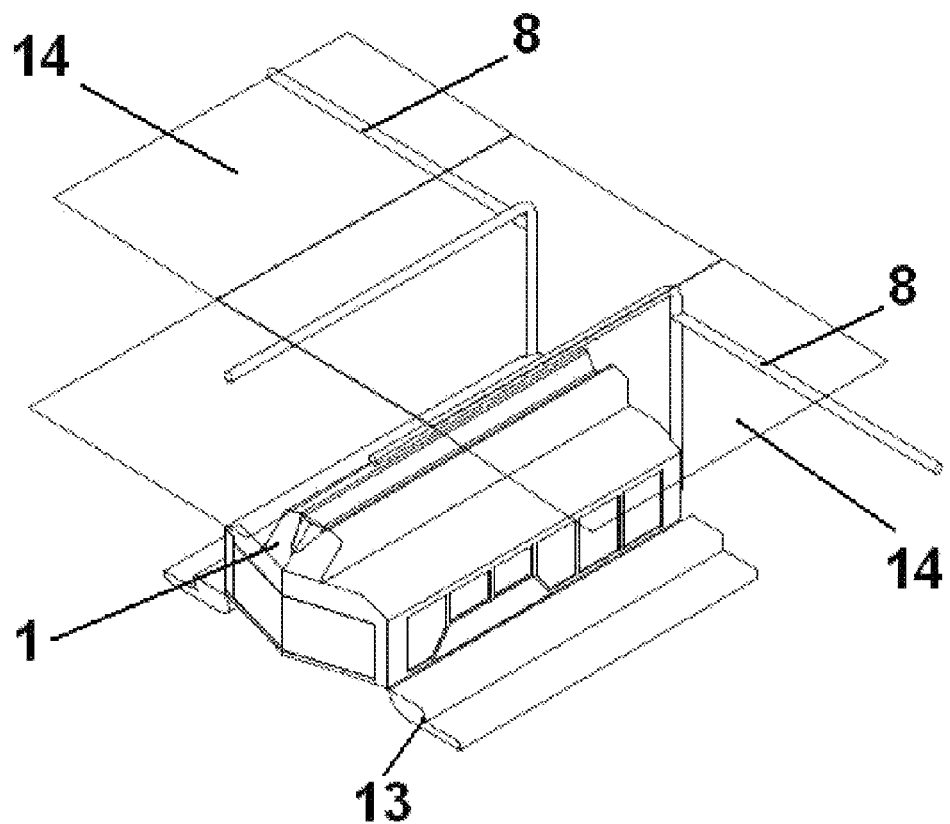
Figure 1E:
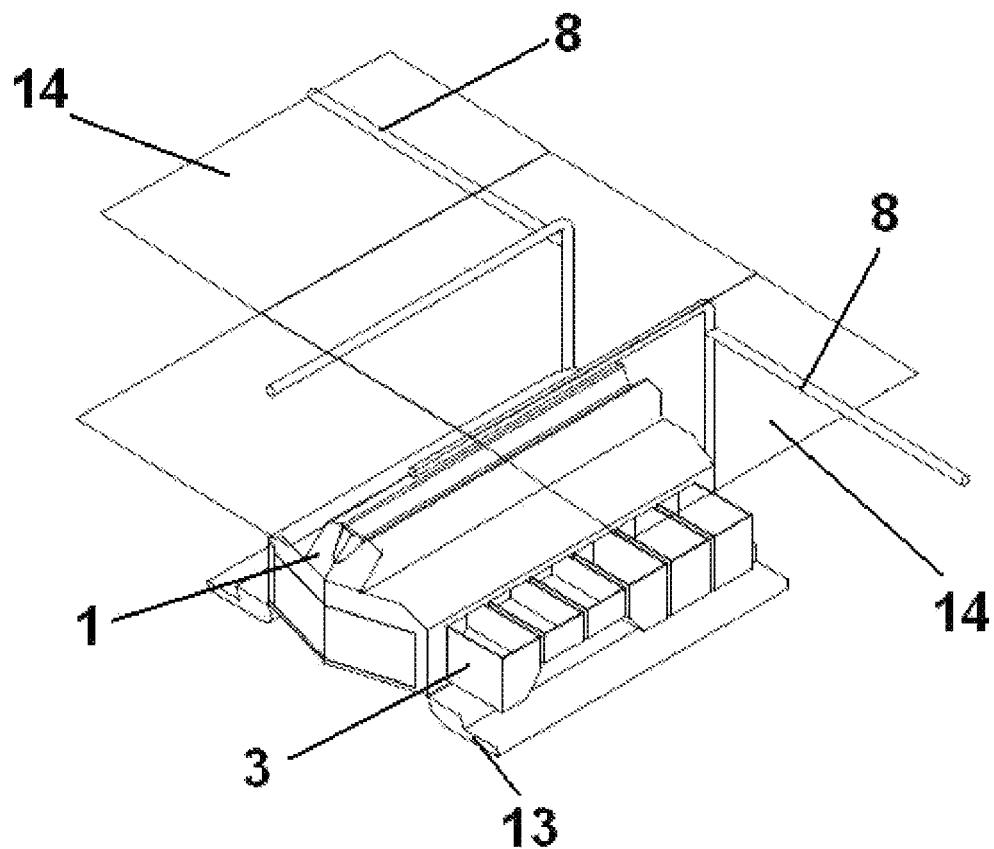
Figure 2:
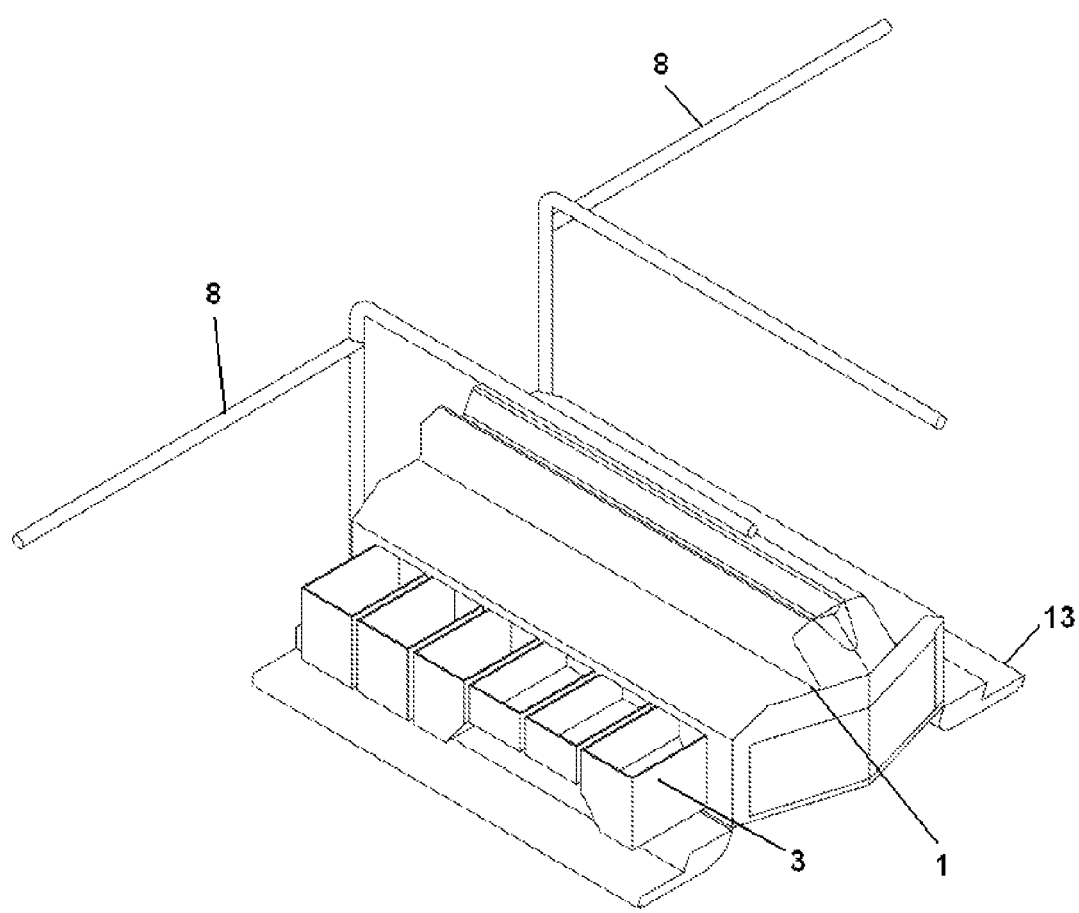
FIG. 2 shows an axonometric view of the main elements of the inside and support of the structure, including the steps, the hanging rod and open drawers, wherein the following elements are shown, as follows:
1—Shell;
3—Drawers;
8—Hanging rods for wetsuits and dry-suits;
13—Ramp/Access steps.
Figure 3:
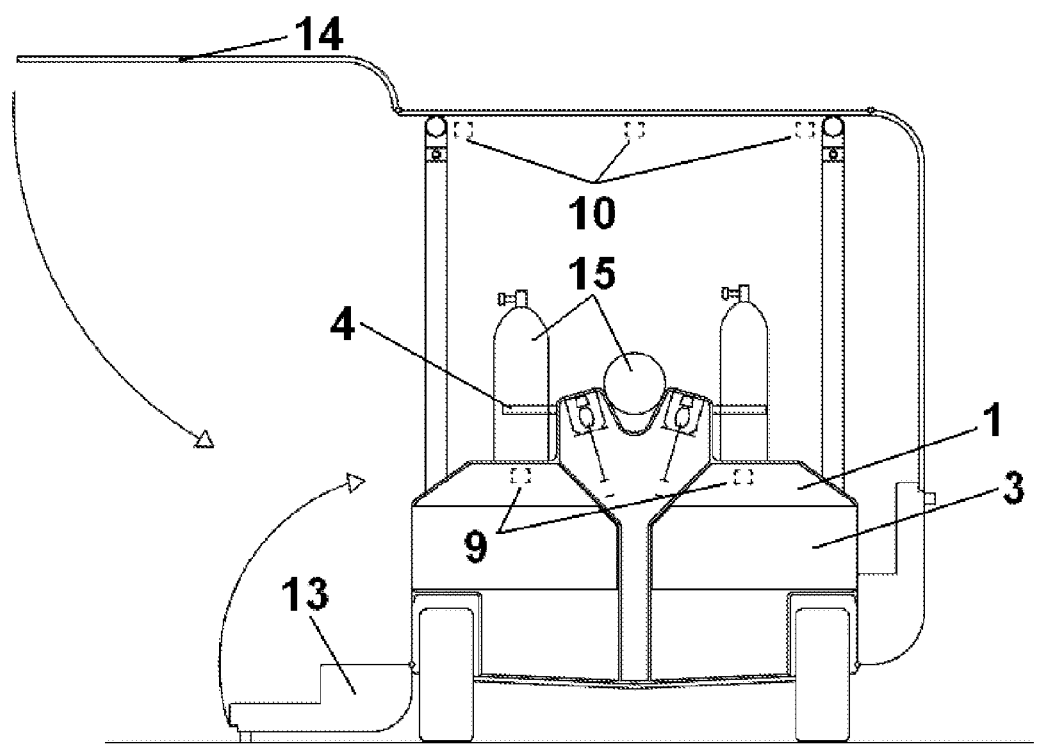
FIG. 3 shows a side view of the mobile scuba diving centre with the protection awnings unfolded. In this Figure, some key elements are likewise shown, namely the following:
1—Shell;
3—Drawers;
4—Scuba tank clipping devices;
9—Spray lines to wash the drawers;
10—Spray lines to wash wetsuits, dry-suits, BCs and scuba tanks;
13—Ramp/Access steps;
14—Protection awnings;
15—Scuba tank.
Figure 4:
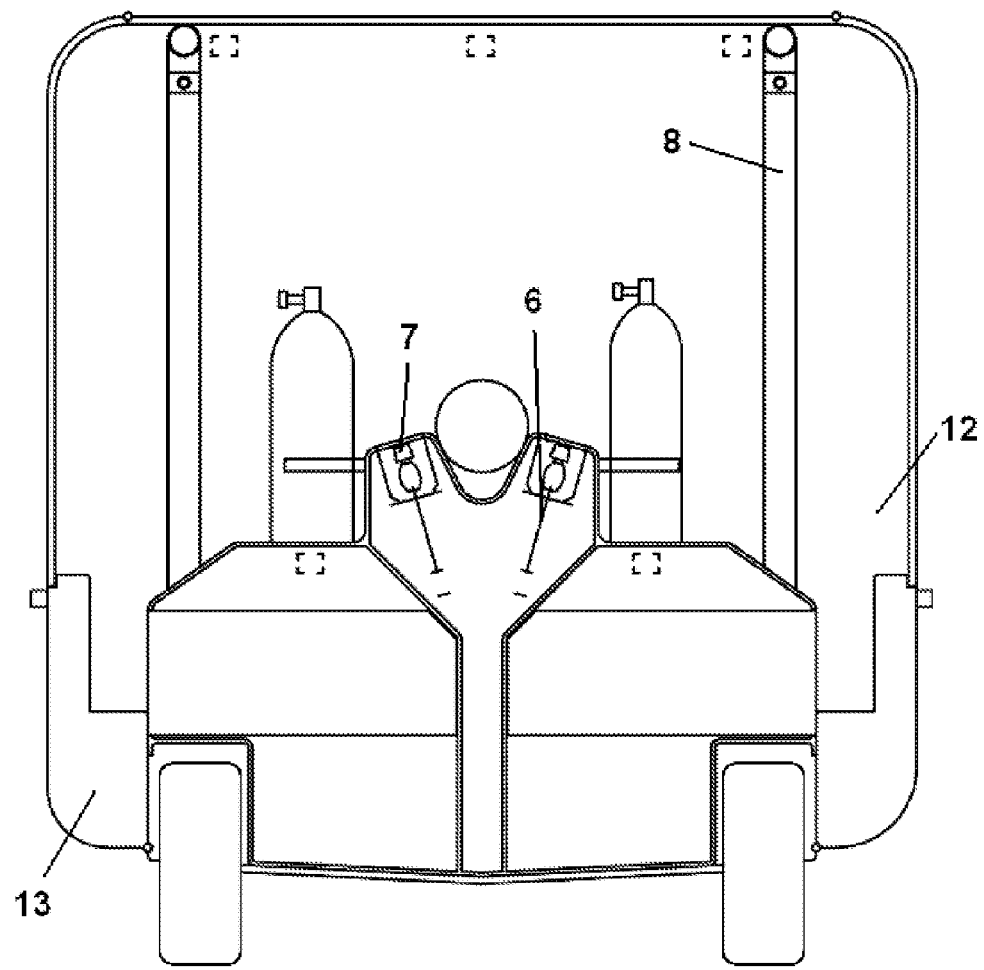
FIG. 4 shows a side view of the mobile scuba diving centre with the protection awnings folded. In this Figure, some key elements are likewise shown, namely the following:
6—Compressor's hose lines;
7—Adapters for the scuba tanks filling;
8—Hanging rods for wetsuits and dry-suits;
12—Bodywork;
13—Ramp/Access steps.
Figure 5:
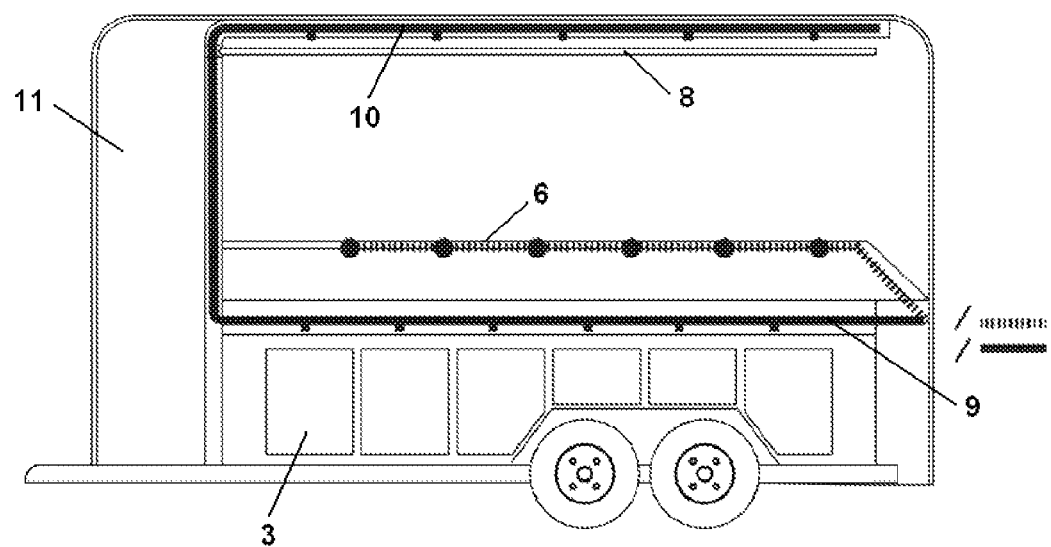
FIG. 5 illustrates a side view of the mobile scuba diving centre assembled onto a mobile trailer base, whereupon the following elements are shown, as follows:
3—Drawers;
6—Compressor's hose lines;
8—Hanging rods for wetsuits and dry-suits;
9—Spray lines to wash the drawers;
10—Spray lines to wash wetsuits, dry-suits, BCs and scuba tanks;
11—Stowage area.
Figure 6:
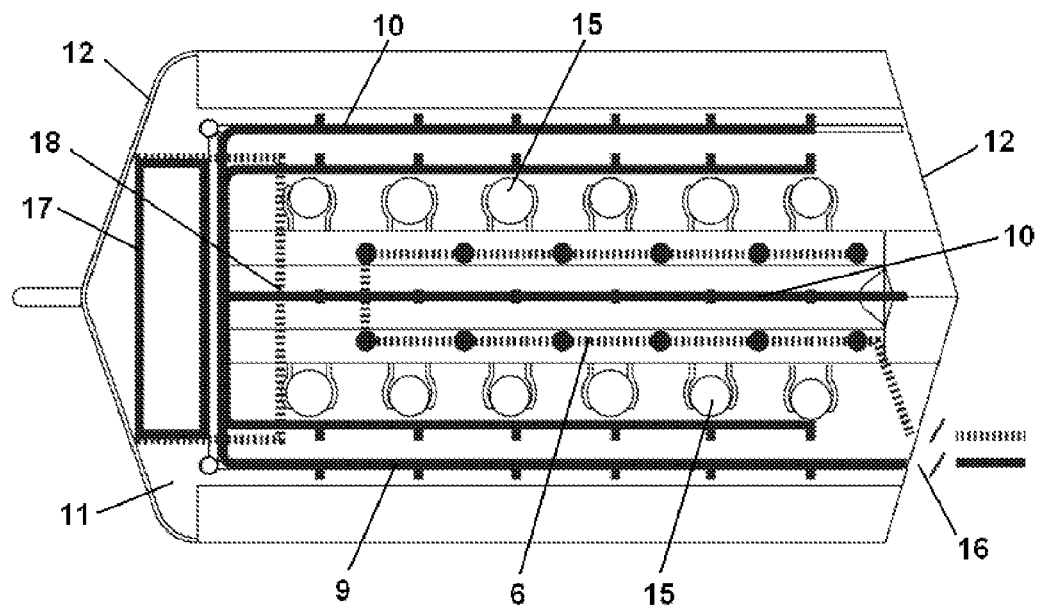
FIG. 6 shows an upper view of the mobile scuba diving centre, where the following elements are shown, as follows:
6—Compressor's hose lines;
9—Spray lines to wash the drawers;
10—Spray lines to wash wetsuits, dry-suits, BCs and scuba tanks;
11—Stowage area;
12—Bodywork;
15—Scuba tank;
16—Interconnection to external supply networks of air and/or water;
17—Water tank assembly area;
18—Compressor assembly area.
Figure 7:
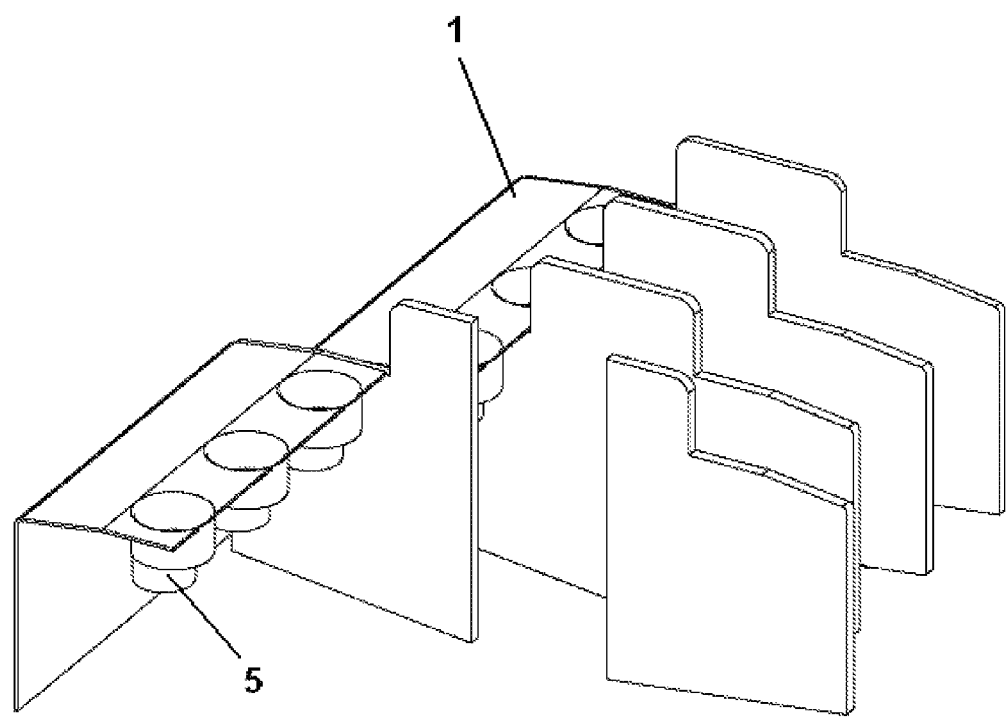
FIG. 7 illustrates the scuba tank securing area, where the following elements are shown, as follows:
1—Shell;
5—Scuba tank support boxes.

The mobile scuba diving centre is a complete mobile, fixed dive centre with air lines for filling scuba tanks and water lines to wash the integrated equipment, hereby described as non-limiting as a module applied over a motor vehicle-based trailer.

The version that includes a trailer and depicted in the assembly of drawings enclosed hereto, describes the mobile scuba diving centre carrying scuba gear for twelve divers.

As far as the trailer is concerned, the mobile scuba diving centre is concentrated in a trailer assembled onto a typical chassis, with a base module and bodywork made of fibreglass with steelwork. The base module comprises a shell (1) that is fibreglass moulded. The shell (1) comprises stowage drawers (3) for the scuba divers equipment, ramp/access steps (13), scuba tank clipping devices (4) or boxes (5) to support scuba tanks (15), the compressor's hose lines for filling scuba tanks (6), adapters for the scuba tank filling station (7), a rotary hanging rod to hang wetsuits and dry-suits (8), the hose, spray lines to wash the equipment inside the drawers (9).

The hoses, spray line assembly to wash BCs, scuba tanks and wetsuits (10) is secured to the interior ceiling of the bodywork structure (12), which includes a stowage area (11). Structure and the bodywork are designed so to, as they are closed, ensure the equipment safety inside, either when the vehicle is parked or is travelling.

DETAILED OPERATION OF THE MOBILE SCUBA DIVING CENTRE

The operation of the mobile scuba diving centre starts with the opening of the bodywork, thus changing the trailer into a fully operational scuba diving centre, as the ramp/access steps (13) are lowered, followed with unfolding the protection awnings (14) and unfolding the hanging rods (8) whereupon wetsuits and dry-suits are to be arranged, in hangers.

The remaining equipment related to each diver, namely, weight belt, fins, mask, regulator and further accessories are properly stored within individual drawers (3) directly under the scuba tank (15) that shall be used by the diver. The Buoyancy Compensator Jackets [BCs] are carried already geared up onto scuba tanks (15).

Upon completion of diving operation, each diver shall return the scuba gear, which shall be promptly and correctly arranged to be washed, for recharging of scuba tanks (15) and for its transportation. Scuba tanks (15) are to be recharged, by using the adapters (7) of the compressor's hose lines to fill scuba tanks (6) incorporated within the structure and, as the awnings and the ramp/steps are folded, the spraying system can be activated to wash the entire scuba gear (9, 10).

The mobile scuba diving centre allocates an area for the assembly of a tap water tank and the relevant water pump for the equipment washing (17) and a compressor to fill the scuba tanks (18). Such compressor can be of a portable type. Filling and washing stations can also be fed via an external compressor line and water supply network, whereby its connection is directly made outside the structure (16). Once it has been washed, the equipment is properly stored to be dried and to be conveyed, as it becomes ready to be used again.

The following Claims further emphasise the preferred embodiments of this invention.

The invention claimed is:

1. A mobile scuba diving center that includes a base structure comprising the following elements:
   a shell (1);
   stowage drawers (3);
   tank clipping devices (4) or support boxes (5) for the scuba tanks (15);
   compressor hose lines for scuba tank filling (6);
   circuit adapters for the scuba tank filling station (7);
   hanging rods for wetsuits and dry-suits (8);
   hose and spray lines to wash the scuba gear inside the drawers (9);
   hose and spray lines to automatically, and not manually, wash wetsuits, buoyancy compensator jackets (BCs) and scuba tanks (10) disposed inside the mobile scuba diving center; and
   ramps/access steps (13).

2. The mobile scuba diving center of claim 1, wherein the hanging rods for wetsuits and dry-suits (8) have a rotary base.

3. The mobile scuba diving center of claim 1, further comprising a sealed coverage applied thereto.

4. The mobile scuba diving center of claim 1, wherein the base structure is equipped with lighting means.

5. The mobile scuba diving center of claim 1, wherein adapters to interconnect the compressor hoses to scuba tanks are arranged in compartments embedded onto the base structure.

6. The mobile scuba diving center of claim 1, wherein the hose and spray lines (10) are secured into the interior ceiling of the structure.

7. The mobile scuba diving center of claim 1, comprising an area for the assembly of a water tank (17).

8. The mobile scuba diving center of claim 1, comprising an area for the assembly of a compressor (18).

9. The mobile scuba diving center of claim 1, comprising interconnections to external supply networks of air and water (16).

10. Use of the mobile scuba diving center of claim 1 in diving operations for recreational, commercial, scientific or rescue/security purposes.

11. The mobile scuba diving center of claim 2, further comprising a sealed coverage applied thereto.

12. The mobile scuba diving center of claim 11, wherein the base structure is equipped with lighting means.

13. The mobile scuba diving center of claim 12, wherein adapters to interconnect the compressor hose lines to scuba tanks are arranged in compartments embedded onto the base structure.

14. The mobile scuba diving center of claim 13, wherein the hose and spray lines (10) are secured into the interior ceiling of the structure.

15. The mobile scuba diving center of claim 14, comprising an area for the assembly of a water tank (17).

16. The mobile scuba diving center of claim 15, comprising an area for the assembly of a compressor (18).

17. The mobile scuba diving center of claim 16, comprising interconnections to external supply networks of air and water (16).

18. Use of the mobile scuba diving center of claim 17 in diving operations for recreational, commercial, scientific or rescue/security purposes.

* * * * *